US008204645B2

(12) United States Patent
Weston

(10) Patent No.: US 8,204,645 B2
(45) Date of Patent: Jun. 19, 2012

(54) SELF-LEARNING AUTOLOCATION OF ALL TIRE ID'S ON A MULTI-AXLE VEHICLE

(75) Inventor: David Alan Weston, Hendersonville, NC (US)

(73) Assignees: Compagnie Generale des Etablissements Michelin, Clermont-Ferrand (FR); Michelin Recherche Et Technique, Granges-Paccot (CH)

( * ) Notice: Subject to any disclaimer, the term of this patent is extended or adjusted under 35 U.S.C. 154(b) by 253 days.

(21) Appl. No.: 12/664,511

(22) PCT Filed: Jun. 20, 2007

(86) PCT No.: PCT/US2007/014319
§ 371 (c)(1),
(2), (4) Date: Dec. 14, 2009

(87) PCT Pub. No.: WO2008/156447
PCT Pub. Date: Dec. 24, 2008

(65) Prior Publication Data
US 2010/0191409 A1 Jul. 29, 2010

(51) Int. Cl.
*G06F 19/00* (2011.01)
(52) U.S. Cl. ........................ 701/33.9; 701/29.1; 701/33.4
(58) Field of Classification Search .................... 701/29, 701/32, 35, 29.1, 33.4, 33.9
See application file for complete search history.

(56) References Cited

U.S. PATENT DOCUMENTS

| 4,510,484 | A | 4/1985 | Snyder |
| 4,862,486 | A | 8/1989 | Wing et al. |
| 5,457,447 | A | 10/1995 | Ghaem et al. |
| 5,749,984 | A | 5/1998 | Frey et al. |
| 6,278,361 | B1 * | 8/2001 | Magiawala et al. ........... 340/438 |
| 6,278,363 | B1 | 8/2001 | Bezek et al. |
| 7,006,946 | B1 | 2/2006 | Tyndall |
| 7,057,503 | B2 * | 6/2006 | Watson ........................ 340/440 |
| 7,800,487 | B2 * | 9/2010 | Miyamoto .................... 340/442 |
| 2004/0128044 | A1 * | 7/2004 | Hac ................................ 701/48 |
| 2005/0057346 | A1 | 3/2005 | Ogawa |
| 2007/0156320 | A1 * | 7/2007 | Breed et al. ..................... 701/70 |
| 2008/0272899 | A1 * | 11/2008 | Penzotti ........................ 340/444 |
| 2009/0240399 | A1 * | 9/2009 | Dagenais et al. ............... 701/42 |

OTHER PUBLICATIONS

Related U.S. Patent Application communication.
PCT International Search Report for PCT/US07/014319, dated Jul. 17, 2008.
"Time-Voltage QRS Area of the 12-Lead Electrocardiogram," Peter M. Okin et al., Journal of the American Heart Association, Apr. 1998, pp. 937-941.

* cited by examiner

*Primary Examiner* — Hussein A. Elchanti
(74) *Attorney, Agent, or Firm* — Dority & Manning, P.A.

(57) ABSTRACT

Disclosed is an apparatus and methodology for identifying tire locations associated with a vehicle (10). Sensed variations in tire related parameters are measured as a vehicle traverses a known or ascertainable travel path (FIG. 3). Data accumulated over one or more measurement windows may be analyzed to determine the location of each individual tire (20) associated with a vehicle (10). Measurements and accumulation of data may be initiated upon detection of a stationary vehicle state exceeding a predetermined time, a predetermined lateral acceleration, and/or a predetermined vehicle speed.

14 Claims, 2 Drawing Sheets

SELF-LEARNING AUTOLOCATION OF ALL TIRE ID'S ON A MULTI-AXLE VEHICLE

FIELD OF THE INVENTION

The present subject matter relates to vehicle wheel position location determination. More particularly, the present subject matter relates to systems and methodologies involving self-determination of all wheel (tire) positions on a multi-axle vehicle.

BACKGROUND OF THE INVENTION

The incorporation of electronic devices with pneumatic tire structures has been shown to yield many practical advantages. Tire electronics may include sensors and other components for obtaining information regarding various physical parameters of a tire, such as temperature, pressure, number of tire revolutions, vehicle speed, etc. Such performance information may be useful in tire monitoring and warning systems, and may even be employed with feedback systems to monitor proper tire pressure levels.

U.S. Pat. No. 5,749,984 (Frey et al.) discloses a tire monitoring system and method that is capable of determining such information as tire deflection, tire speed, and number of tire revolutions. Another example of a tire electronics system can be found in U.S. Pat. No. 4,510,484 (Snyder), which concerns an abnormal tire condition warning system.

U.S. Pat. No. 4,862,486 (Wing et al.) also relates to tire electronics, and more particularly discloses an exemplary revolution counter for use in conjunction with automotive and truck tires.

U.S. Pat. No. 7,006,946 (Tyndall) relates to the intentional inducement of specific vibrations into a tire containing a vibration sensor to transmit information to electronics associated with the sensor.

Yet another potential capability offered by electronics systems integrated with tire structures corresponds to asset tracking and performance characterization for commercial vehicular applications. Commercial truck fleets, aviation crafts and earthmover/mining vehicles are all viable industries that could utilize the benefits of tire electronic systems and related information transmission. Tire sensors can determine the distance each tire in a vehicle has traveled and thus aid in maintenance planning for such commercial systems. Vehicle location and performance can be optimized for more expensive applications such as those concerning earth-mining equipment. Entire fleets of vehicles may be tracked using RF tag transmission, exemplary aspects of which are disclosed in U.S. Pat. No. 5,457,447 (Ghaem et al.).

In the operation of commercial truck fleets, vehicle down time can be very costly, possibly resulting in the loss of an entire payload for a time-critical shipment. Tire management is one of the principal challenges for truck fleet management. Tire longevity is greatly affected by inflation pressure maintenance. If the position of a tire ID on the vehicle is known, along with the inflation pressure, then repair and replacement can be more efficiently planned and executed.

It would be beneficial in a tire-vehicle-fleet system if pressure loss could be automatically detected and such information transmitted to fleet operation management. Knowing the tire ID, the rate of pressure loss, and the position on the vehicle would permit fleet operation management to efficiently arrange the correct replacement tire size and type in an appropriate timeframe along that vehicle's route, thus minimizing down-time.

While various implementations of wheel location systems have been developed, and while various combinations of information have been wirelessly relayed from a tire or wheel assembly using conventional technologies, no design has emerged that generally encompasses all of the desired characteristics as hereafter presented in accordance with the subject technology.

SUMMARY OF THE INVENTION

In view of the recognized features encountered in the prior art and addressed by the present subject matter, an improved methodology for automatically locating each tire mounted on a vehicle has been developed.

In an exemplary configuration, methodologies are provided to automatically identify mounting positions for each tire mounted on a vehicle.

In accordance with aspects of certain other embodiments of the present subject matter, methodologies are provided to automatically determine tire positions based on a self-learning process.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
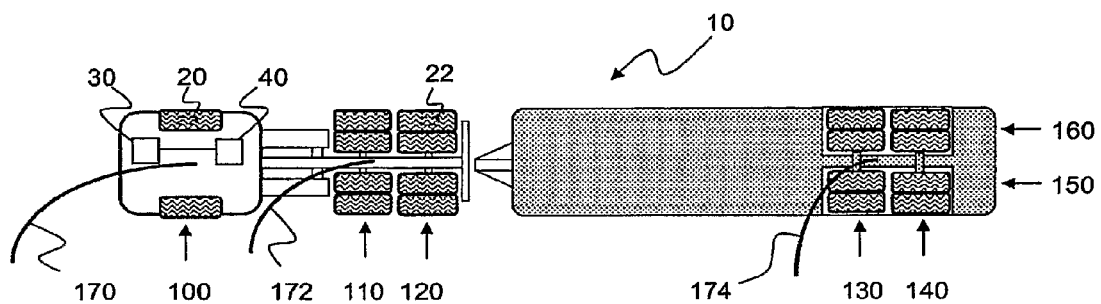
FIG. 1 illustrates relative path radii among portions of a conventional 18-wheeler tractor trailer combination.

Repeat use of reference characters throughout the present specification and appended drawings is intended to represent same or analogous features or elements of the invention.

DETAILED DESCRIPTION OF THE PREFERRED EMBODIMENTS

As discussed in the Summary of the Invention section, the present subject matter is particularly concerned with systems and methodologies involving automatic determination of all wheel (tire) positions on a multi-axle vehicle.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

The present subject matter discloses methodologies for automatically locating the wheel positions of each tire on a vehicle. In accordance with the present technology, normal vehicle maneuvers are analyzed in a self-learning process that does not require any external mechanical input.

In accordance with the present technology, self-learning autolocation of tire IDs is based on signals generated by a rotation sensor attached to each tire. The rotation sensor, in certain embodiments may correspond to a single piezoelectric sensor and may be designed to attach to and integrate with the tire inner liner in such manner as to reflect the tire shape as it changes in time during rolling. The choice of location of a piezoelectric sensor in the tire should be taken into consideration when interpreting the piezoelectric sensor signal. In accordance with the present subject matter, analysis of signals relating to the tire's revolution count or speed and, optionally also, contact patch length or counter-deflection is employed to determine the tire's mounting location.

These signals, or reduced descriptors of these signals, may be recorded by an In Tire Electronic Module (ITEM) in a manner which permits subsequent transmission to an Electronic Control Unit (ECU) 40 on vehicle 10 for analysis and comparison in a common time window, for example using a back-door synchronization of the various signals. Analysis of accumulated data within a common time window as made possible through the back-door synchronization of signals, permits simultaneous comparison of all tire positions on the vehicle.

Back-door synchronization of stored data signals may be achieved by associating a time signal from a clock within each ITEM with the stored data. As data is collected, a beginning point is established based on predetermined criteria. Collected data is subsequently transmitted to ECU 40 in such a way that data from each ITEM may be compared within the exact same window of time. The predetermined criteria for starting a measurement period may correspond to a start signal from ECU 40 or from detected travel path or vehicle conditions.

Reference will now be made in detail to the presently preferred embodiments of the subject vehicle wheel automatic location (autolocation) system and methodologies. Referring now to the drawings, FIG. 1 illustrates a tractor 10 and trailer combination in accordance with the present subject matter. As previously noted, the present subject matter may be termed "self-learning autolocation."

It should be appreciated by those of ordinary skill in the art that each of the tires mounted on tractor-trailer 10 are provided with an In Tire Electronic Module (ITEM), representatively illustrated at 20, 22, comprising at least one piezoelectric sensor. Based on signals generated by the piezoelectric sensor each ITEM produces and transmits information based at least in part on change in shape of the tire with which it is associated. In addition, each ITEM may be provided with additional information within an onboard memory. Such additional information may relate to information particular to the tire with which the sensor is associated including, but not limited to a unique identifier (ID), manufacturing information including manufacturing date and location, tire type, and other related information. For purposes of the present disclosure, it will be assumed that the sensor has at least an associated ID that may be transmitted along with collected data as well as other data including, for example, onboard clock data and possible other data as will be more fully described later. More specific discussion of such known sensor types is not believed to be necessary but rather may be seen from the hereinabove noted patents that are hereby incorporated herein for all purposes.

Figure 2:
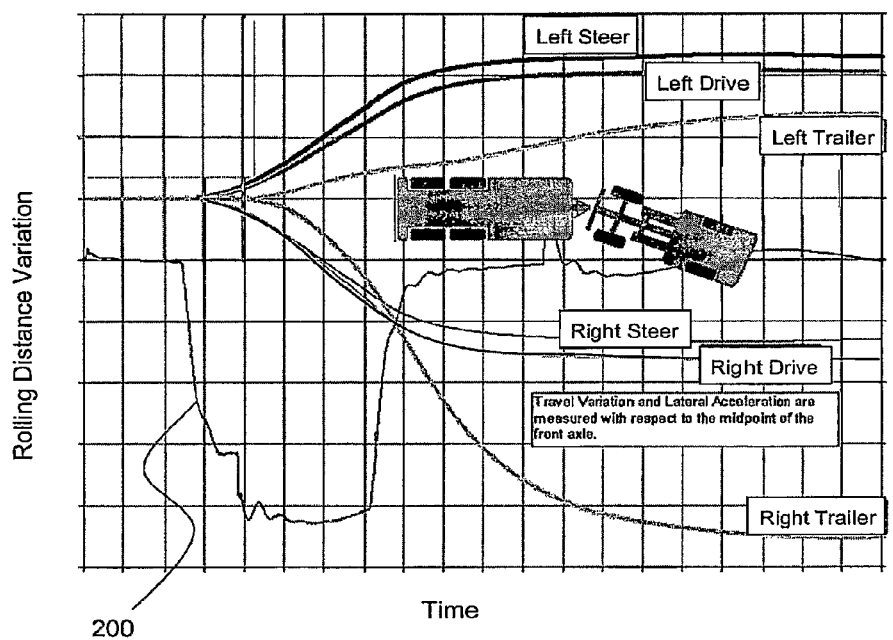
FIG. 2 graphically illustrates lateral acceleration and rolling distance variation during a right turn of a tractor trailer combination.
Figure 3:
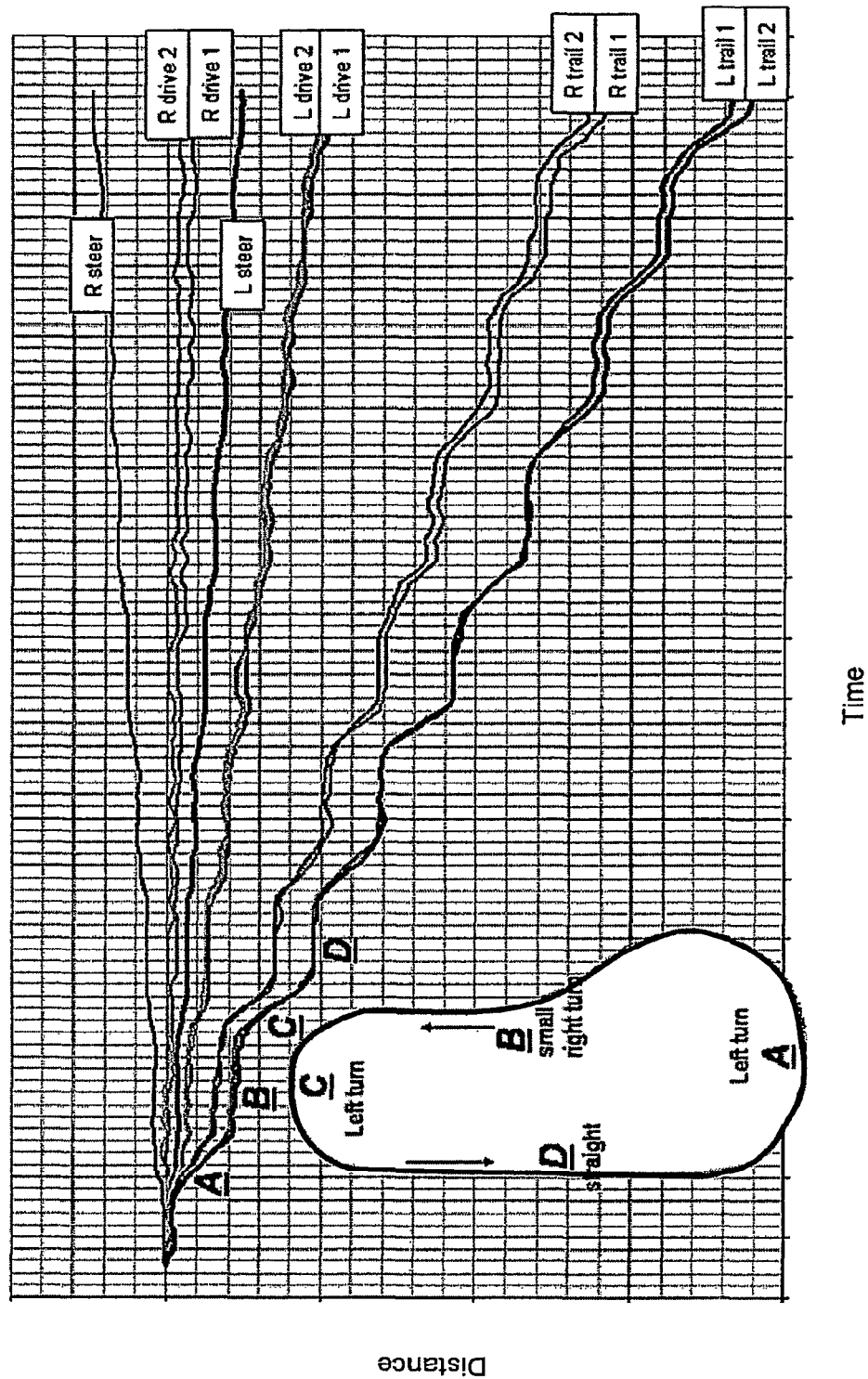
FIG. 3 graphically illustrates on-vehicle cumulative rolling distance measurements during a series of predominately left turns.

With reference now to FIGS. 1-3, an exemplary embodiment of the present subject matter will now be described. As previously mentioned, the present subject matter may be described as autolocation by self-learning. In autolocation by self-learning, no external mechanical input is needed. Instead, the system compares and analyzes all tire signals arising from normal or directed maneuvers in successive common time windows.

Autolocation by self-learning occurs in two phases. In the first phase, Steer-Drive-Trailer-Left-Right (S-D-T-L-R) and dual pair identification may be accomplished by revolution counting alone or, alternatively, by measurement of corresponding speed. In the second phase dual pair Inside-Outside (I-O) discrimination and tandem axle Fore-Aft (F-A) discrimination are determined by the measurement of individual tire load changes during successive measurement-time-windows defined by lateral acceleration thresholds or passage over a predefined travel path including selected specific turns. Tire position conclusions are derived from the application of vehicle load transfer rules to the accumulated, successive, measurement-time-window data. Randomly occurring road obstructions may also be employed to discriminate tandem axle Fore-Aft wheel location.

With reference to FIG. 1, it will be noted that steer wheel positions are designated as corresponding to wheel location 100, drive positions are at wheel locations 110, 120, and trailer wheel locations are at wheel locations 130, 140. For reference purposes, the left side is designated by arrow 150 while the right side is designated by arrow 160. As may be observed from FIG. 1, dual pair tires are located on both the left and right sides of locations 110, 120, 130, and 140 so that with the steer wheels at location 100, wheel locations for a common 18-wheel tractor-trailer combination may be identified.

It will be further appreciated by those of ordinary skill in the art that the path radii associated with various wheel locations of tractor-trailer combination 10 engaged in a turn differ as illustrated in FIG. 1. Distances traveled is a function of path radii and vehicle side are illustrated in FIG. 2. Lateral acceleration, ay, 200 is illustrated in FIG. 2 as a super imposed graph over the indicated rolling distance variations for reference. As generally indicated in FIG. 1, path radius 170 associated with steer wheels 100 is greater than path radius 172 associated with drive wheels 110, 120, which, in turn, is greater than path radius 174 associated with trailer wheels 130, 140. Further the path radius of an outside wheel (relative to the direction of a turn) is greater than the path radius of it corresponding inside wheel. Further still, those of ordinary skill in the art will appreciate there is a small difference between the path radii of drive wheels 110 and drive wheels 120 as well as between trail wheels 130 and 140. Such differences will be more fully explained with reference to FIG. 3 later.

Phase one of the self-learning (S-D-T-L-R) and dual pair identification process may proceed as follows. A single piezoelectric sensor or some other revolution counting capable sensor device is installed in each tire on the tractor and trailer, possibly as a portion of representatively illustrated ITEMs 20, 22. In addition a lateral accelerometer 30 may be installed on the tractor. Lateral acceleration $a_y$ is measured and known by a vehicle Electronic Control Unit (ECU) 40 at all times when the vehicle is running. Knowledge of the lateral acceleration experienced is necessary to define and control the measurement time frame and to correctly interpret rolling distance measurement within that time frame for cumulative contribution to the (S-D-T-L-R) conclusion. Revolution count, N, occurs when a tire is rolling. This value N will normally be updated continuously on-board the tire, in the individual In Tire Electronic Modules (ITEMs). It should be appreciated by those of ordinary skill in the art that lateral acceleration may be measured by way of an onboard lateral accelerometer or, alternatively, may be inferred by directing the vehicle over a known path having predetermined turns and tracking, for example, distance traveled and speed to obtain location on the predetermined path. Further, as an alternative measurement of tire speed during the maneuvers described above may be substituted for revolution counting.

If the vehicle has been stationary for more than a predetermined time, for example, a time sufficient to allow for the possibility of a tire change, ECU 40 will recognize that an autolocation sequence needs to be initiated. Therefore, (S-D-T-L-R) autolocation will be conducted and compared to the last autolocation state.

An (S-D-T-L-R) autolocation process may proceed as follows: If the lateral acceleration $a_y$ is greater than a predetermined threshold then ECU 40 will transmit an (N,t) request, i.e., a data request, to all ITEMs 20, 22. In response to an (N,t) request, each ITEM 20, 22 transmits its current revolution count total, N, its time of tire clock, $t_{ITEM}$, clock speed, and its individual ID. If any data is missing, then that dataset will be deleted. If no data is missing and if the lateral acceleration $a_y$ is greater than a predetermined threshold for more than a predetermined minimum time, $t_{minimum}$, then ECU 40 will transmit an (N,t) request again as soon as the lateral acceleration $a_y$ drops below the predetermined threshold. It should be appreciated that each ITEM responds exactly the same way to any (N,t) request.

If ECU 40 receives valid (N,t) data for all ID's (i.e., if two complete sets are received), then delta N's (ΔN) will be calculated within the normalized time measurement window, corresponding to the lateral acceleration $a_y$ threshold window, and data will be added to a cumulative summation of S-D-T-L-R. Successive ΔN; data will be added by ID to one of two tables, depending on left vs. right turn.

This process is repeated whenever lateral acceleration $a_y$ is greater than a predetermined threshold for more than a minimum time, $t_{minimum}$, until the count separation is large enough to permit a S-D-T-L-R conclusion that meets predetermined confidence criteria. Confidence intervals or criteria and their selection relate to known statistical analysis techniques and, thus, will not be further discussed herein. Once the predetermined confidence criteria is met, ECU 40 will discontinue transmission of (N,t) requests until the predetermined vehicle stop time is again exceeded. Alternatively, of course, the data collection process may be manually or automatically triggered as a vehicle enters on to a known path having predetermined turn patterns.

The data from each table will be put in descending order of magnitude. As illustrated in FIG. 3, the left turn table will eventually separate from top to bottom where Rsteer>Rdrive>Lsteer>Ldrive>Rtrail>Ltrail. In similar fashion, the right turn table will eventually separate from top to bottom where Lsteer>Ldrive>Rsteer>Rdrive>Ltrail>Rtrail. The autolocation position conclusion must satisfy both tables with sufficient separation based on the predetermined decision confidence criteria. The dual pair identification process proceeds at the same time as the (S-D-T-L-R) process and from the same accumulated data (FIG. 3). All dual pairs will be identified as those ID's having substantially identical (i.e., within a predetermined statistically inseparable number) cumulative revolution count. As may be seen at the right hand portion of the graph of FIG. 3, difference in revolution count N (i.e., tire distance traveled) over time will separate to identify the various wheel locations. In accordance with an alternate embodiment of the present subject matter, instantaneous speed measurement may be used to determine S-D-T-L-R with data accumulated under circumstances where lateral acceleration exceeds a predetermined value for a predetermined time. For example, S-D-T-L-R determination may be quickly achieved by directing the vehicle in a series of single maneuver circular maneuvers, i.e., driving in a circle above a predetermined speed to achieve the required lateral acceleration.

In a second phase of the self-learning autolocation process, dual pair Inside-Outside (I-O), tandem axle, and Fore-Aft (F-A) separation determination is performed. The dual Inside-Outside (I-O) discrimination can be determined by additional processes, again taking advantage of the principles of cumulative data leading to increasing decision confidence. It should be appreciated that in some instances it may not be necessary to perform the second phase of the subject wheel location if location only as to whether the wheel location is a steer, drive, or trail wheel and whether it is on the left or right side of the vehicle is necessary.

Inside-Outside (I-O) discrimination may be accomplished through analysis of a contact patch piezoelectric signal leading to an assessment of how the tire load is affected by vehicle load transfer during lateral acceleration. It would be most convenient if a piezoelectric sensor were employed as the previously discussed revolution counter as well as the contact patch signaling device, but in any event, a piezoelectric sensor may be used to provide contact patch signals for this portion of the wheel location discrimination.

Inside-Outside (I-O) discrimination may be accomplished by comparing a series of values $A_i$ corresponding to the average for a series of contact patch piezoelectric signals $\lambda_{ay}$ recorded during the (S-D-T-L-R) $a_y$ threshold window to the average contact patch signals recorded following the (S-D-T-L-R) $a_y$ threshold window.

The series of values $(A_i)$ vs. time will correspond to tire load increasing, decreasing, or remaining constant during the measurement window. However, this could be problematic since a changing-load window from a brief turn could be too short to collect a long enough $A_i$ series. Such a window could be long enough when the load transfer is caused by a sustained road camber or long curve.

Another approach is to simply accumulate $A_i$ measurement window sums along with the (S-D-T-L-R) left and right tables with lateral acceleration ($a_y$) load transfer rules applied to deduce (I-O). For example, in a dual pair during a left turn, the load on the left inside tire is greater than the load on the left outside tire and the load on the right outside tire is greater than the load on the right inside tire. This relationship may be symbolically represented as: $Z_{LI}>Z_{LO}$ and $Z_{RO}>Z_{RI}$ where Z is load.

It should be appreciated that as tire load increases, the change in average value $A_{avg}$ should reflect both the contact patch wavelength (c.p. length) and amplitude (c.p. end curvature) changes. Simple voltage peak is noise sensitive and c.p. length is sometimes indeterminate. One variable that may impact measurements relates to the position of the piezoelectric sensor relative to a drive sculpture tread element. Any effect based on sensor position, however, would be constant as long as the tread depth remained and certainly through any given set of measurement windows.

Various methodologies for separating signals from separate tandem axles are possible including: longitudinal accelerometer $a_x$ window determination which is analogous to lateral acceleration $a_y$, to compare load transfer during braking by trailer, braking by whole vehicle, braking by engine (both normal deceleration and Jake brake) as well as acceleration. There are some predictable load changes during these situations (e.g. acceleration torque effect on drive and steer loads) but may not be general enough to achieve axle separation. In fact, it has been found that braking load transfers may be dependent on vehicle payload distribution as well as what axle is braked, and such variables sometimes invert expected behavior.

Another approach to dual IO separation is to look at the relative change in contact patch wavelength, λ, during a turn and after the turn. That is, to compare λ values during lateral acceleration to λ values immediately after the lateral acceleration. Lateral acceleration may be recognized either by a signal from an onboard lateral motion sensor or from recognition of location on a predetermined travel path configured with a number of predetermined turns.

Examined in a more holistic way, the general issue of self-learning autolocation leads one to consider the problem of axle separation in a tandem (i.e., two or more axles that are not separated by any articulaton) determination relative to the whole vehicle. One approach to such a holistic considerations of all axles leads to the consideration of bump timing. Bump timing may be achieved by using piezoelectric counter-deflection signals corresponding to random road obstacle impacts (bumps) to separate axles. By examining the timing difference between detection of a random event among the tires of the several axles of a vehicle one may determine relative positions of plural axles. There may be issues with this type of determination for an all-axle approach, however, considering the now-limited problem of a (S-D-T-L-R)+(I-O) known set of tire ID's, the problem is much simpler.

To begin this portion of the self-learning autolocation process, ECU 40 sends a Fore-Aft (F-A) request when the vehicle speed (revolution frequency) is above a predetermined minimum. Preferably the F-A request is also limited to some maximum lateral acceleration $a_y$, so that the vehicle will generally be driving straight along a travel path. Upon receipt of the F-A request, all ITEMs look for some predetermined counter-deflection threshold waveform corresponding to a random impact. The measurement window following the F-A request must be of a predetermined duration since there is no start-stop phenomenon to define the window.

When a threshold voltage from a piezoelectric sensor resulting from contact with a random obstruction (bump) is exceeded on any tire, the event time is recorded. Data from each ITEM by ID may then be accumulated and tabulated in the form of event times within a given measurement window. Each data set comparison is limited to tires associated with a tandem on a known side of the vehicle. If no event occurs or if more than one impact event occurs for a given ITEM during a measurement window, that data is rejected. If only one event occurs in a window, and if an event also occurs in another window, then the times are compared, thereby determining which axle is the leading axle.

As the present portion of the analysis is based on random occurrences, there may be conflicting individual window conclusions, but by accumulating sufficient comparisons for a given dual pair, one conclusion will eventually dominate in the same manner as illustrated in FIG. 3 with respect to the accumulation of S-D-T-L-R data. As in previous comparisons, it should be appreciated that the back door synchronization of accumulated signals is a necessary component of Fore-Aft discrimination.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for automatically determining mounting locations of tires mounted on a vehicle, comprising:
providing each tire with a rotation sensor;
associating each tire with a unique identification;
associating a lateral acceleration sensor with the vehicle;
accumulating data from the rotation sensor during a measurement time frame defined by sensed lateral acceleration exceeding or falling below at least one lateral acceleration threshold;
associating the accumulated data with a tire's unique identification; and
analyzing the accumulated data to determine the tire's mounting location on the vehicle.

2. The method of claim 1, wherein accumulating data from the rotation sensor during a measurement time frame comprises:
initiating accumulation of data from the rotation sensor upon sensed lateral acceleration exceeding a predetermined amount.

3. The method of claim 1, wherein the rotation sensor comprises a contact patch sensitive sensor, the method further comprising:
accumulating data from each contact patch sensor upon sensed lateral acceleration exceeding a predetermined amount,
accumulating data from each contact patch sensitive sensor upon sensed lateral acceleration falling below a predetermined amount, and
comparing accumulated data to determine relative changes in contact patch length during and immediately after a predetermined lateral acceleration to determine relative tire positions.

4. The method of claim 3, further comprising:
providing each tire with a contact patch sensitive sensor;
providing each tire with a clock;
accumulating data from each contact patch sensitive sensor and each clock upon sensed lateral acceleration falling below a predetermined amount; and
comparing accumulated data from each tire in a common time window to determine relative tire locations.

5. The method of claim 3, wherein the contact patch sensitive sensor comprises a piezoelectric sensor.

6. The method of claim 2, wherein accumulating data from the rotation sensor during a measurement time frame comprises:
   initiating accumulation of data from the rotation sensor upon sensed lateral acceleration falling below a predetermined threshold.

7. A system for automatically determining mounting locations of tires mounted on a vehicle, comprising:
   an electronic control unit associated with said vehicle;
   a rotation sensor associated with each tire;
   a lateral acceleration sensor associated with said vehicle;
   a clock associated with each tire; and
   a memory device associated with each tire, said memory device storing a unique identification and serving as a store for data from said rotation sensor;
   wherein the electronic control unit is configured to initiate accumulation of data from the rotation sensor associated with each tire during a measurement time frame defined by sensed lateral acceleration exceeding or falling below at least one lateral acceleration threshold.

8. The system of claim 7,
   wherein said memory device is configured to receive and store data from each said rotation sensor and each said clock, and wherein said electronic control unit is configured to receive data from said memory device and said lateral acceleration sensor and to compare signals received in a common time window based on said clock signals from each tire.

9. The system of claim 7, further comprising:
   a contact patch sensor associated with each tire; and
   wherein said memory device is configured to receive and store data from each contact patch sensor and each said clock, and wherein said electronic control unit is configured to receive data from said memory device and to compare data received in a common time window based on clock signals from each tire.

10. The system of claim 9,
    wherein said memory device is configured to receive and store data from each said contact patch sensor and each said clock upon detection of lateral acceleration above a predetermined amount.

11. The system of claim 10, wherein said memory device is further configured to receive and store data from each said contact patch sensor and each said clock upon detection of lateral acceleration falling below said predetermined amount and wherein said electronic control unit is configured to receive data from said memory device and to compare data received when lateral acceleration is above the predetermined amount against data received when the lateral acceleration is below the predetermined amount.

12. The system of claim 11, wherein the rotation sensor and the contact patch sensor comprise a single piezoelectric sensor.

13. The system of claim 8, further comprising:
    a contact patch sensor associated with each tire,
    wherein said memory device is further configured to receive and store data from each said contact patch sensor and each said clock upon detection of lateral acceleration below a predetermined amount and vehicle speed above a predetermined amount.

14. The system of claim 13, wherein the rotation sensor and the contact patch sensor comprise a single piezoelectric sensor.

* * * * *